US009216626B2

(12) United States Patent
Kiselis

(10) Patent No.: US 9,216,626 B2
(45) Date of Patent: Dec. 22, 2015

(54) VEHICLE SUSPENSION SYSTEM AND METHOD FOR INCREASING THE ROLL RATE OF A VEHICLE

(75) Inventor: Gregory Paul Kiselis, Oak Ridge, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 0 days.

(21) Appl. No.: 14/398,163

(22) PCT Filed: May 17, 2012

(86) PCT No.: PCT/US2012/038341
§ 371 (c)(1),
(2), (4) Date: Oct. 31, 2014

(87) PCT Pub. No.: WO2013/172839
PCT Pub. Date: Nov. 21, 2013

(65) Prior Publication Data
US 2015/0123358 A1    May 7, 2015

(51) Int. Cl.
| | |
|---|---|
| *B60G 11/34* | (2006.01) |
| *B60G 5/03* | (2006.01) |
| *B60G 11/46* | (2006.01) |
| *B60G 17/027* | (2006.01) |

(52) U.S. Cl.
CPC .............. *B60G 17/0275* (2013.01); *B60G 5/03* (2013.01); *B60G 11/34* (2013.01); *B60G 11/46* (2013.01); *B60G 2202/112* (2013.01); *B60G 2202/152* (2013.01); *B60G 2400/0521* (2013.01); *B60G 2500/20* (2013.01); *B60G 2500/22* (2013.01)

(58) Field of Classification Search
CPC ...... B60G 17/0275; B60G 11/46; B60G 5/03; B60G 11/34; B60G 2400/0521; B60G 2202/112; B60G 2500/20; B60G 2500/22; B60G 2202/152
See application file for complete search history.

(56) References Cited

U.S. PATENT DOCUMENTS

| | | | | |
|---|---|---|---|---|
| 1,819,548 | A | * | 8/1931 | Erickson .......................... 267/45 |
| 2,838,321 | A | | 5/1948 | Gouirand |
| 3,285,621 | A | | 11/1966 | Turner, Jr. |
| 3,494,632 | A | | 2/1970 | Bostrom |
| 3,520,548 | A | | 7/1970 | McGee |
| 3,762,487 | A | | 10/1973 | Bilas |
| 3,970,293 | A | | 7/1976 | Sweet et al. |
| 4,102,424 | A | * | 7/1978 | Heinze ........................ 180/24.02 |
| 4,134,604 | A | * | 1/1979 | Jackson ........................ 280/86.5 |
| 4,452,329 | A | | 6/1984 | Stone |

(Continued)

OTHER PUBLICATIONS

International Search Report and Written Opinion of PCT/US2012/038341 dated Aug. 3, 2012.

*Primary Examiner* — Drew Brown
(74) *Attorney, Agent, or Firm* — Michael Pruden; Martin Farrell

(57) ABSTRACT

The present invention relates to a vehicle provided with a sprung mass, including a vehicle frame, at least one axle provided with first and second ends, and a suspension system provided with a mechanical springs and leveling springs. The mechanical springs connect the axle ends to the frame and are provided with a spring rate in a rebound direction that is greater than or substantially equal to a spring rate in a jounce direction. The leveling springs are configured to support the sprung mass at one or more sprung mass load points, whereby the first and second mechanical springs may become substantially unloaded by the sprung mass of the vehicle at the one or more sprung mass load points.

14 Claims, 7 Drawing Sheets

(56) References Cited

U.S. PATENT DOCUMENTS

| | | |
|---|---|---|
| 4,504,080 A | 3/1985 | VanDenberg |
| 4,871,188 A | 10/1989 | Baxter |
| 5,217,248 A | 6/1993 | Reast |
| 5,354,091 A | 10/1994 | Baxter et al. |
| 5,458,360 A * | 10/1995 | Raidel, Sr. .................. 280/686 |
| 5,465,997 A * | 11/1995 | Heitzmann ............ 280/124.177 |
| 6,364,340 B1 | 4/2002 | Taylor |
| 7,249,780 B1 | 7/2007 | Wilson |
| 7,637,513 B2 | 12/2009 | Kotulla et al. |
| 7,850,195 B2 * | 12/2010 | Simard et al. ................. 280/678 |
| 8,033,565 B2 * | 10/2011 | Holroyd ........................ 280/676 |
| 8,262,112 B1 * | 9/2012 | Noble et al. ............ 280/124.116 |
| 8,657,315 B2 * | 2/2014 | Noble et al. ............ 280/124.116 |

\* cited by examiner

VEHICLE SUSPENSION SYSTEM AND METHOD FOR INCREASING THE ROLL RATE OF A VEHICLE

FIELD OF THE INVENTION

The present invention relates to a vehicle suspension system that includes leveling springs and mechanical springs, wherein the mechanical springs are provided with a spring rate in a rebound direction that is greater than or substantially equal to a spring rate in a jounce direction and the leveling springs are configured to support the sprung mass at one or more sprung mass load points, whereby the first and second mechanical springs may become substantially unloaded by the sprung mass of the vehicle at one more sprung mass load points.

BACKGROUND OF THE INVENTION

Vehicles, for example, truck tractors, may include suspensions that are provided with leveling springs, which may take the form of air bladders. Such suspensions are commonly referred to as air-ride suspensions.

In conventional air-ride truck tractor suspensions mechanical suspension springs, such as leaf springs, may be used to support the sprung mass of the vehicle. In such an arrangement both the mechanical suspension springs and the leveling springs control the ride and handling characteristics of the truck tractor. Air-ride systems are particularly desirable due to the fact that the air springs of the system are connected to a pneumatic air supply on the truck tractor, whereby the amount of air with in the leveling springs may be adjusted in order to vary the height and the ride and handling characteristics of the truck tractor.

For purposes of handling, however, during a roll event, the leveling springs of air ride suspensions tend to only resist roll in the jounce direction as the leveling springs are compressed. The leveling springs on the side of the vehicle that experiences rebound do not generally resist a roll event and in fact encourages roll.

Furthermore, since the mechanical suspension springs support the sprung mass of the vehicle, such suspension springs are normally preloaded in the jounce direction due to the forces exerted by the sprung mass of the vehicle. For this reason, for purposes of handling, during a roll event, the mechanical suspension springs tend to only resist roll in the jounce direction as the mechanical springs are compressed. The mechanical springs on the side of the vehicle that experiences rebound during a roll event will actively encourage roll due to the fact that the springs are preloaded in the jounce direction by the sprung mass of the vehicle.

The present invention relates to a vehicle suspension system that includes leveling springs and mechanical springs, wherein the mechanical springs are provided with a spring rate in a rebound direction that is greater than or substantially equal to a spring rate in a jounce direction and the leveling springs are configured to support the sprung mass at one or more sprung mass load points, whereby the first and second mechanical springs may become substantially unloaded by the sprung mass of the vehicle at one more sprung mass load points.

SUMMARY OF THE INVENTION

According to one embodiment of the present invention, a vehicle comprises a sprung mass, including a vehicle frame, at least one axle provided with first and second ends, and a suspension system provided with a mechanical springs and leveling springs. The mechanical springs connect the axle ends to the frame and are provided with a spring rate in a rebound direction that is greater than or substantially equal to a spring rate in a jounce direction. The leveling springs are configured to support the sprung mass at one or more sprung mass load points, whereby the first and second mechanical springs may become substantially unloaded by the sprung mass of the vehicle at the one or more sprung mass load points.

According to another embodiment of the present invention, a method for increasing the roll rate of a vehicle provided with a sprung mass, including a vehicle frame, at least one axle provided with first and second ends, and a suspension system provided with a mechanical springs and leveling springs, wherein the mechanical springs connect the axle ends to the frame, comprises the steps of using the leveling springs to support the sprung mass at one or more sprung mass load points, whereby the first and second mechanical springs may become substantially unloaded by the sprung mass of the vehicle at the one or more sprung mass load points and providing the mechanical springs with a spring rate in a rebound direction that is greater than or substantially equal to a spring rate in a jounce direction.

ASPECTS

According to one aspect of the present invention, a vehicle comprises:
  a sprung mass, including a vehicle frame;
  at least one axle provided with first and second ends;
  a suspension system provided with a mechanical springs and leveling springs,
  wherein:
    the mechanical springs connect the axle ends to the frame and are provided with a spring rate in a rebound direction that is greater than or substantially equal to a spring rate in a jounce direction; and
    the leveling springs are configured to support the sprung mass at one or more sprung mass load points, whereby the first and second mechanical springs may become substantially unloaded by the sprung mass of the vehicle at the one or more sprung mass load points.

Preferably, the mechanical springs are leaf springs.

Preferably, the leveling springs are air bladders.

Preferably, the mechanical springs are leaf springs provided with a series of stacked individual spring members oriented whereby the lengths of at least some of the individual spring members increase sequentially in the jounce direction.

Preferably, the mechanical springs are leaf springs provided with a series of stacked individual spring members oriented whereby the length of at least some of the individual spring members decrease sequentially in the jounce direction.

Preferably, the mechanical springs are leaf springs provided with a series of stacked individual spring members oriented whereby the lengths of at least some of the individual spring members increase sequentially in the jounce direction and whereby the length of at least some of the individual spring members decrease sequentially in the jounce direction.

Preferably, the at least one axle is a tandem axle provided with first and second axles and wherein the mechanical springs connect the axle ends of the first and second axles to the frame.

According to another aspect of the present invention, a method for increasing the roll rate of a vehicle provided with a sprung mass, including a vehicle frame, at least one axle provided with first and second ends, and a suspension system provided with a mechanical springs and leveling springs, wherein the mechanical springs connect the axle ends to the frame, comprises the steps of:

using the leveling springs to support the sprung mass at one or more sprung mass load points, whereby the first and second mechanical springs may become substantially unloaded by the sprung mass of the vehicle at the one or more sprung mass load points; and providing the mechanical springs with a spring rate in a rebound direction that is greater than or substantially equal to a spring rate in a jounce direction.

Preferably, the mechanical springs are leaf springs.

Preferably, the leveling springs are air bladders.

Preferably, the mechanical springs are leaf springs provided with a series of staked individual spring members and the method further comprises the step of orienting the individual spring members whereby the lengths of at least some of the individual spring members increase sequentially in the jounce direction.

Preferably, the mechanical springs are leaf springs provided with a series of staked individual spring members and the method further comprises the step of orienting the individual spring members whereby the length of at least some of the individual spring members decrease sequentially in the jounce direction.

Preferably, the mechanical springs are leaf springs provided with a series of staked individual spring members and the method further comprises the step of orienting the individual spring members whereby the lengths of at least some of the individual spring members increase sequentially in the jounce direction and orienting the length of at least some of the individual spring members decrease sequentially in the jounce direction.

Preferably, the at least one axle is a tandem axle provided with first and second axles and wherein the mechanical springs connect the axle ends of the first and second axles to the frame.

DETAILED DESCRIPTION OF THE INVENTION

Figure 1:
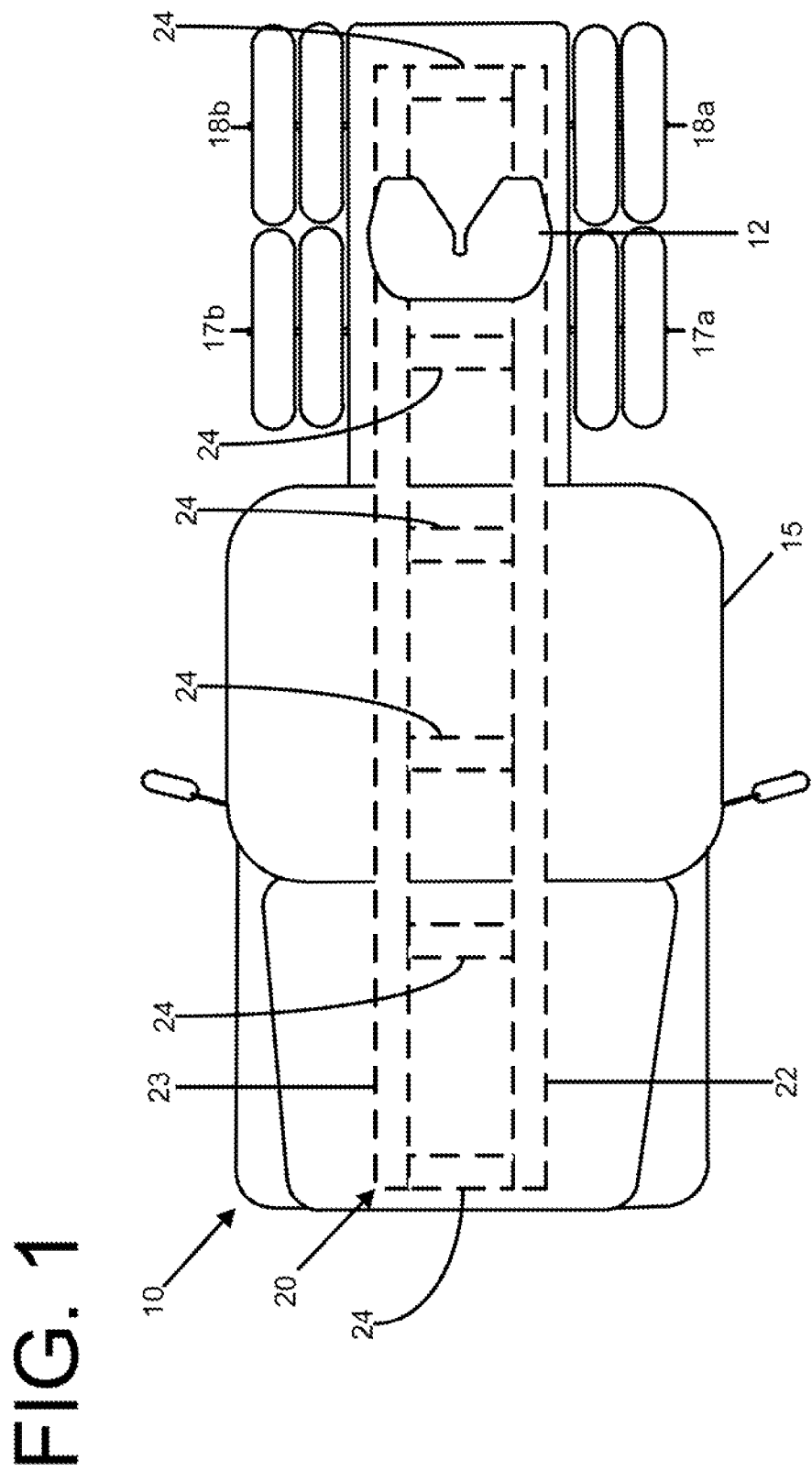
FIG. 1 depicts a vehicle according to one embodiment of the present invention.
Figure 2:
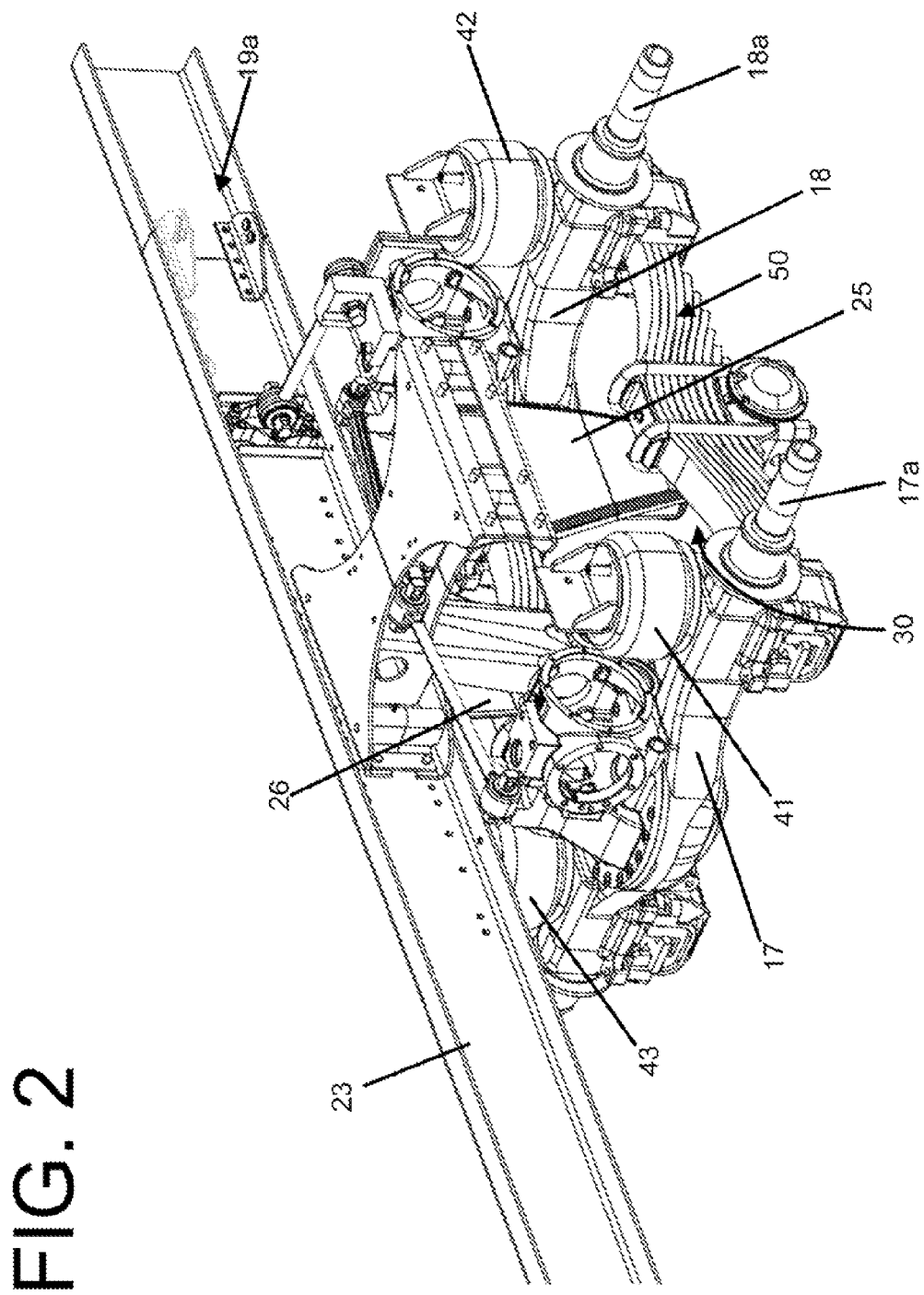
FIG. 2 is an isomeric view of a frame and suspension according to one embodiment of the present invention.
Figure 3:
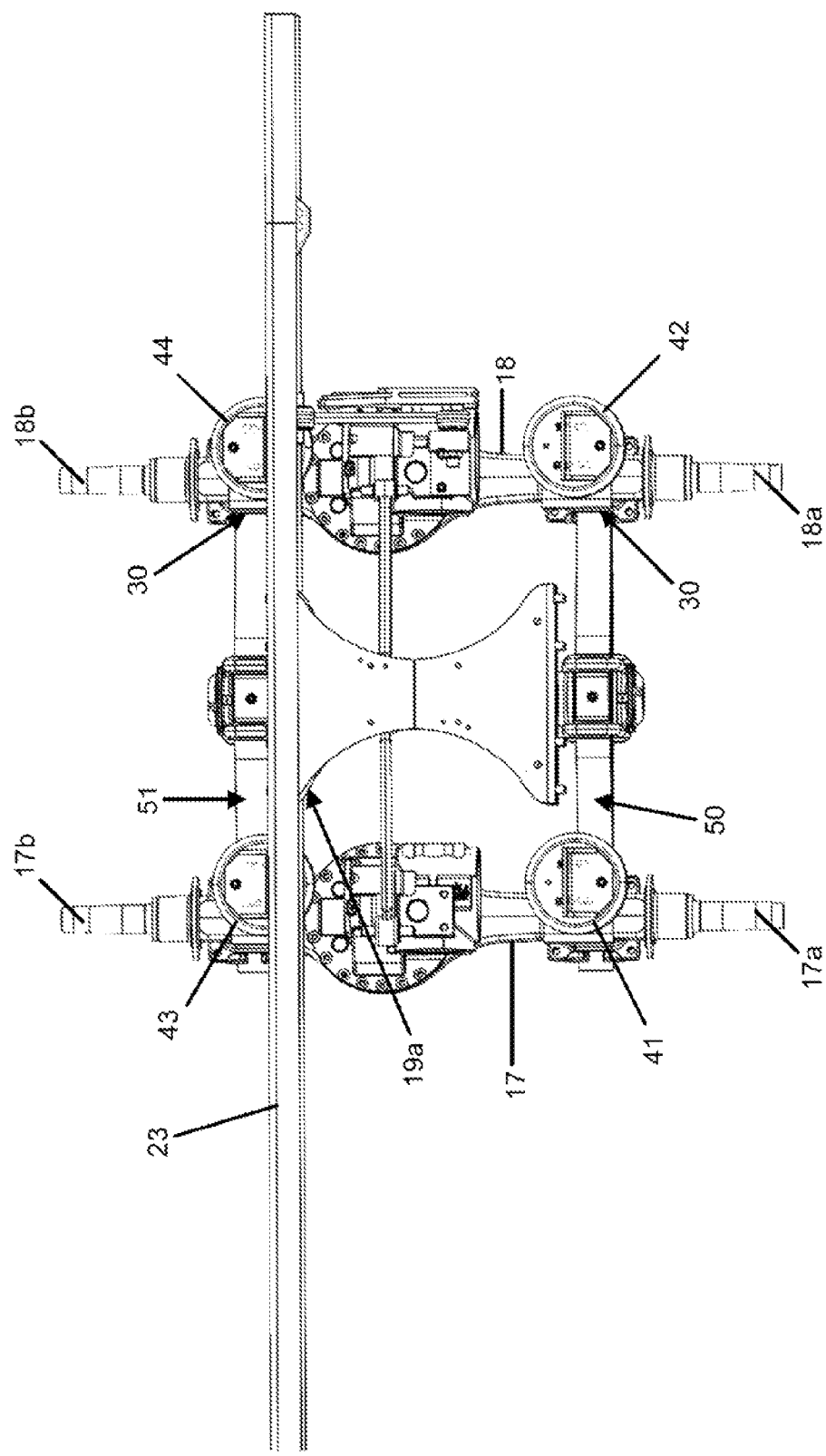
FIG. 3 is a top view of a frame and suspension according to one embodiment of the present invention.

FIG. 1 depicts a vehicle 10 according to one embodiment of the present invention. As shown therein, the vehicle 10 is provided with a body 15, tandem axles 17, 18, and a frame 20. As shown, the vehicle 10 is a truck tractor; however it is within the scope of the present embodiment to utilize the principals of the present embodiment in conjunction with vehicles other than truck tractors.

In the present embodiment depicted, as shown in FIGS. 1-5, the frame 20 includes the first frame rail 22 and a second frame side rail 23. In the present embodiment, the frame side rails 22, 23 are laterally spaced and extend parallel with respect to each other. Also shown, the frame side rails 22, 23 extend generally in a generally longitudinally direction of the vehicle 10. As shown in FIG. 1, the frame side rails 22, 23 are preferably interconnected by a plurality of cross members, as at 24.

Figure 4:
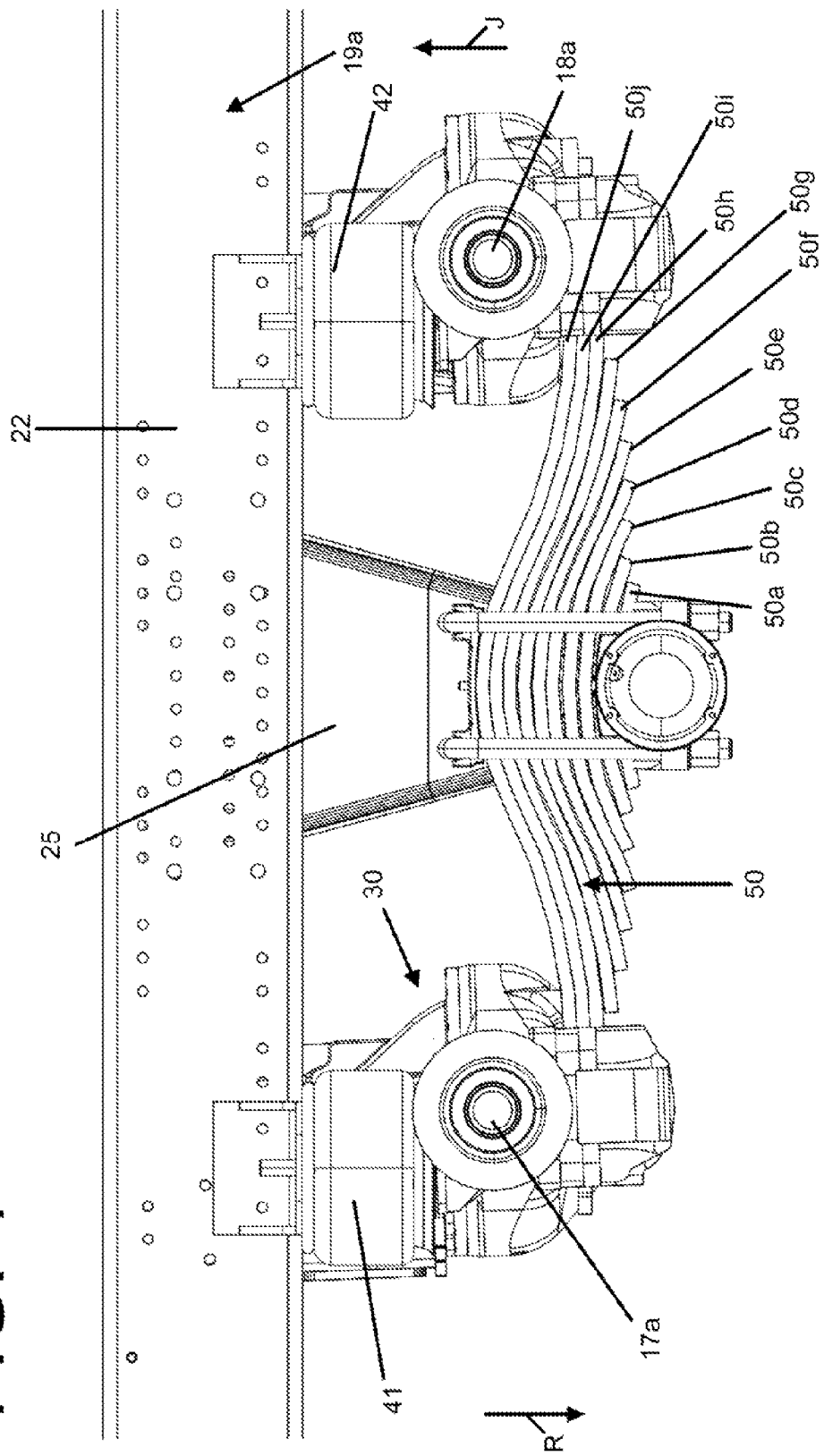
FIG. 4 depicts a side perspective view of a vehicle frame and a suspension system according to one embodiment of the invention.
Figure 5:
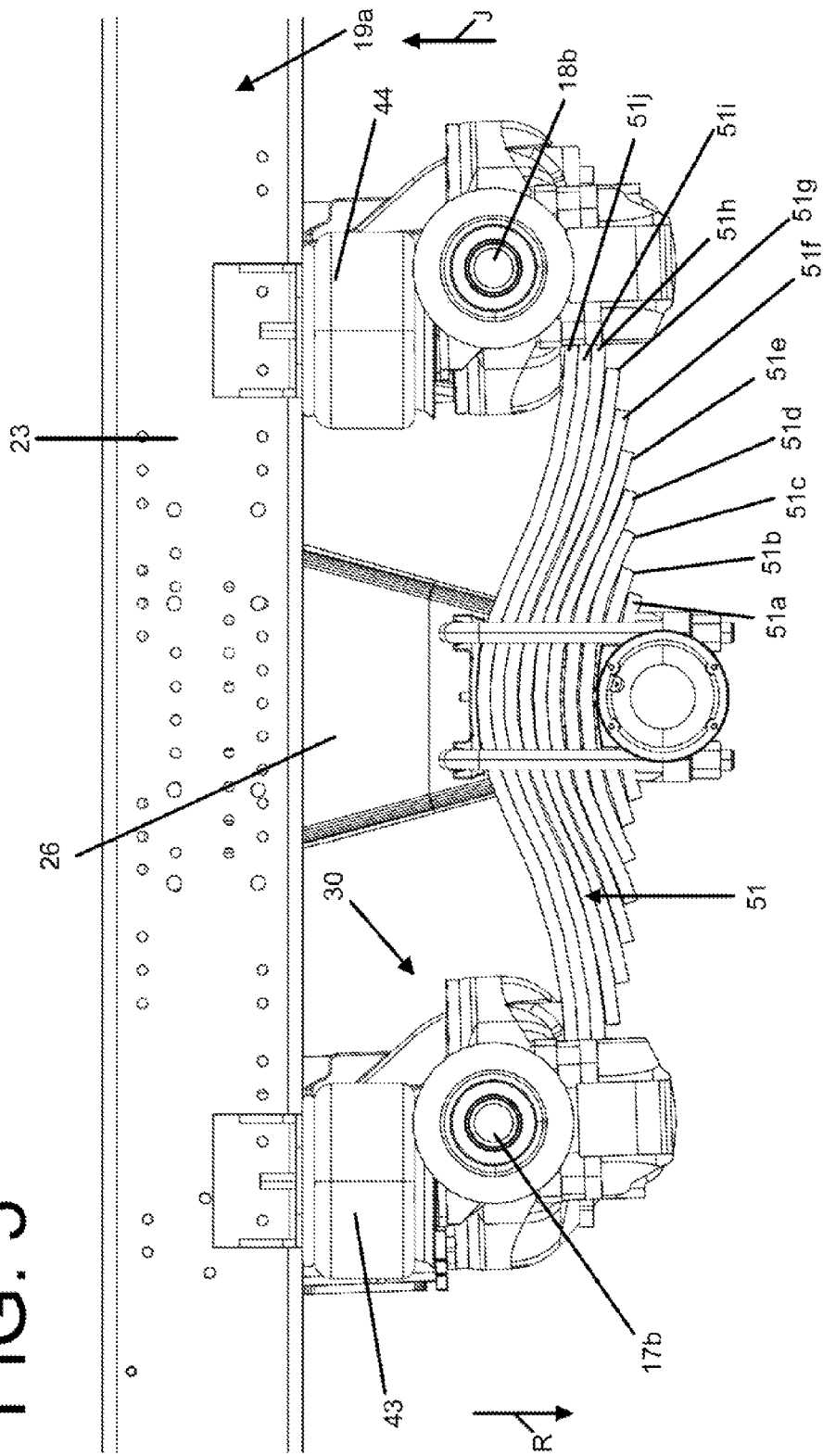
FIG. 5 depicts a side perspective view of a vehicle frame, opposite the side shown in FIG. 2, and a suspension system according to one embodiment of the invention.

Turning now to FIGS. 4 and 5, depending from the frame 20 are first and second hangar brackets 25, 26. As shown, the first and second hangar brackets 25, 26 depend from the respective first and second frame side rails 22, 23 whereby the first and second hangar brackets 25, 26 are substantially centered between the axles 17, 18. According to one aspect of the present embodiment, as shown in FIGS. 4 and 5, the first and second hangar brackets 25, 26 are configured to secure first and second mechanical springs 50, 51 of the suspension system 30 to the frame 20. According to another aspect of the present embodiment, the first and second hangar brackets 25, 26 are configured to locate the first and second mechanical springs 50, 51 along the frame 20.

FIGS. 1-5 depict the tandem axles 17, 18 according to one embodiment. Those of ordinary skill in the art will appreciate that tandem axles 17, 18 are common on trucks, including tractor trucks, and provide greater load capacity than single axles. In the present embodiment, the tandem axles 17, 18 are shown positioned towards the rear of the vehicle 10. As shown, the tandem axles 17, 18 are each provided with a first end 17a, 18a and a second end 17b, 17b. Those of ordinary skill in the art will appreciate that the outer most portion of each of the first ends 17a, 18a and second ends 17b, 18b secure one or more wheels to the vehicle 10. In the present embodiment, both of the tandem axles 17, 18 may receive torque from an engine via a driveline. In alternative embodiments within the scope of the present invention, one or both of the axles 17, 18 may also be uncoupled from the engine.

Turning now to in FIGS. 4 and 5, the vehicle includes a sprung mass 19a and a suspension system 30 provided with a plurality of leveling springs 41-44 and first and second mechanical springs 50, 51. Those of ordinary skill in the art will appreciate that the sprung mass 19a may also include any number of other structure or loads supported by the suspension system 30, including, for example, and not limitation, the body 15 (FIG. 1), the frame 20, and the components in the engine compartment, i.e. engine, radiator, etc. not shown), and the load applied to the vehicle 10 by any trailer (not shown) coupled to the fifth wheel 12 (FIG. 1).

According to one aspect of the present embodiment, the suspension system 30 connects the axles 17, 18 to the frame 20 of the vehicle 10. According to another aspect of the present embodiment, the suspension system 30 at least partially locates the axles 17, 18 along the frame 20. According to yet another aspect of the present embodiment, the suspension system 30 absorbs shocks and vibrations that are encountered or generated as the vehicle 10 travels and at least partially isolates the sprung mass 19a from said shocks and vibrations.

As shown in FIGS. 4 and 5, the first mechanical spring 50 and a second mechanical spring 51 connect the axle ends 17a, 17b and 18a, 18b to the hangar brackets 25, 26 and the frame 20 of the vehicle 10. According to one aspect of the present embodiment, the first and second mechanical springs 50, 51 are configured to flex in a rebound direction R and a jounce direction J as the vehicle 10 travels. According to another aspect of the present embodiment the first and second mechanical springs 50, 51 are provided with a first spring rate in the rebound direction R and a second spring rate in the jounce direction J.

As shown in FIGS. 4 and 5, the leveling springs 41-44 connect the axles 17, 18 to the frame 20 of the vehicle 10. According to one aspect of the present embodiment, the leveling springs 41-44 are bladders that are configured to support the sprung mass 19$a$ at one or more sprung mass load points, whereby the first and second mechanical springs 50, 51 may become substantially unloaded by the sprung mass 19$a$ of the vehicle 10 at one or more sprung mass load points. Those of ordinary skill in the art will appreciate that the amount of the sprung mass load transferred by the leveling springs to the axles 17, 18 may be controlling adjusting the amount of pressurized air supplied to the leveling springs 41-44.

Advantageously, unloading the first and second mechanical springs 50, 51 at one or more load points may allow for the provision of first and second mechanical springs 50, 51 that are provided with lower spring rates than conventional mechanical springs, which, in turn, may provide savings in cost and weight. According to yet another aspect of the present embodiment, unloading the first and second mechanical 50, 51 springs may allow for the provision of first and second mechanical springs 50, 51 provided with a first spring rate in the rebound direction R that is greater than the second spring rate in the jounce direction J. Advantageously, providing mechanical springs 50, 51 with a first spring rate in the rebound direction R that is greater than the spring rate in the jounce direction J provides the suspension system 30 with an increased roll rate, without degrading the ride quality.

FIGS. 4 and 5 depict one example of mechanical springs 50, 51 provided with a spring a first spring rate in the rebound direction R that is greater than a second spring rate in the jounce direction J. As shown, the mechanical springs 50, 51 may be leaf springs provided with a series of stacked individual spring members 50$a$-50$j$, 51$a$-51$j$ oriented whereby the lengths of at least some of the individual spring members, such as, for example, 50$a$-50$h$, 51$a$-51$h$, increase sequentially in the jounce direction J.

Figure 6:
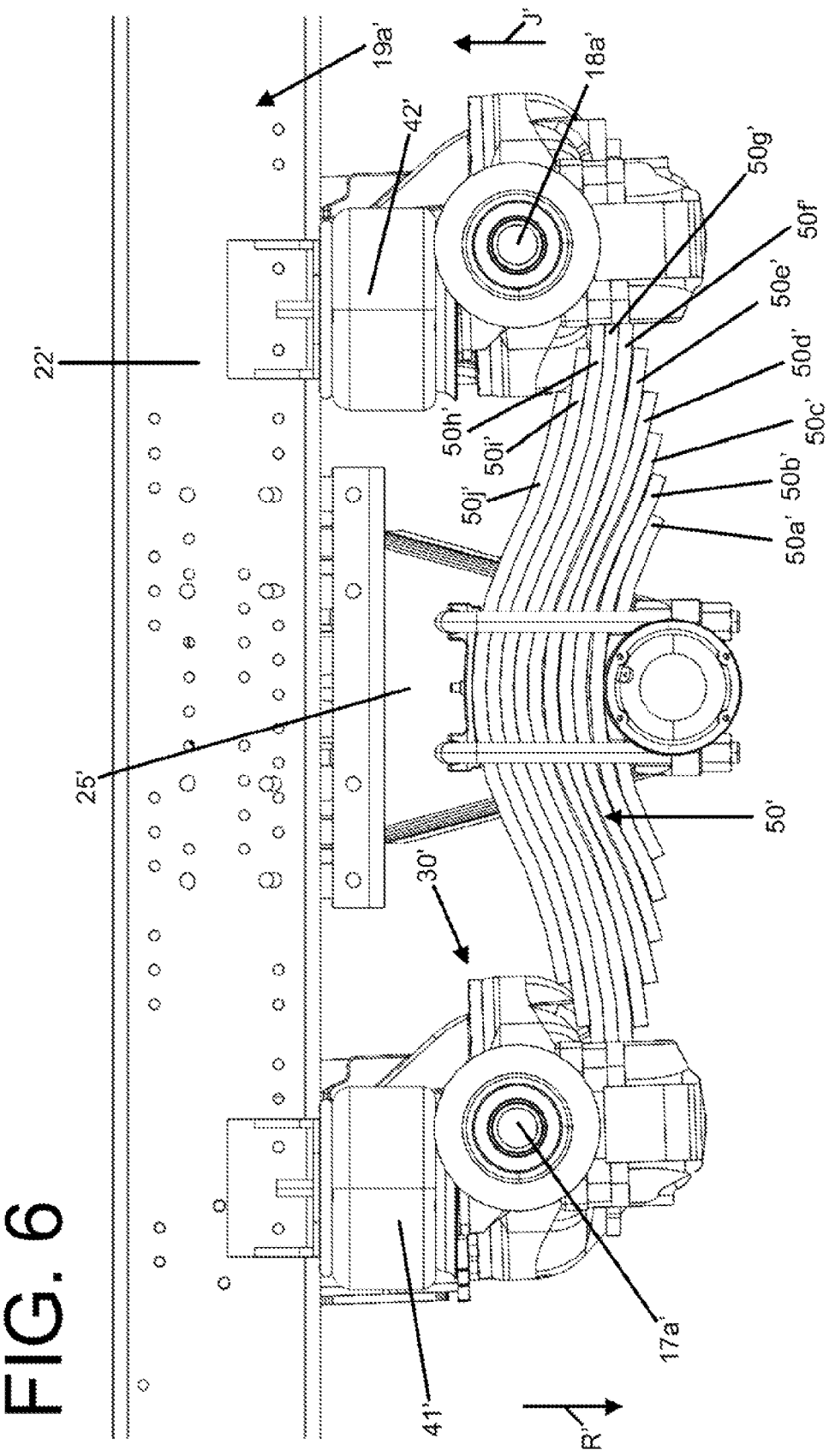
FIG. 6 depicts a side perspective view of a vehicle frame and a suspension system according to one embodiment of the invention.
Figure 7:
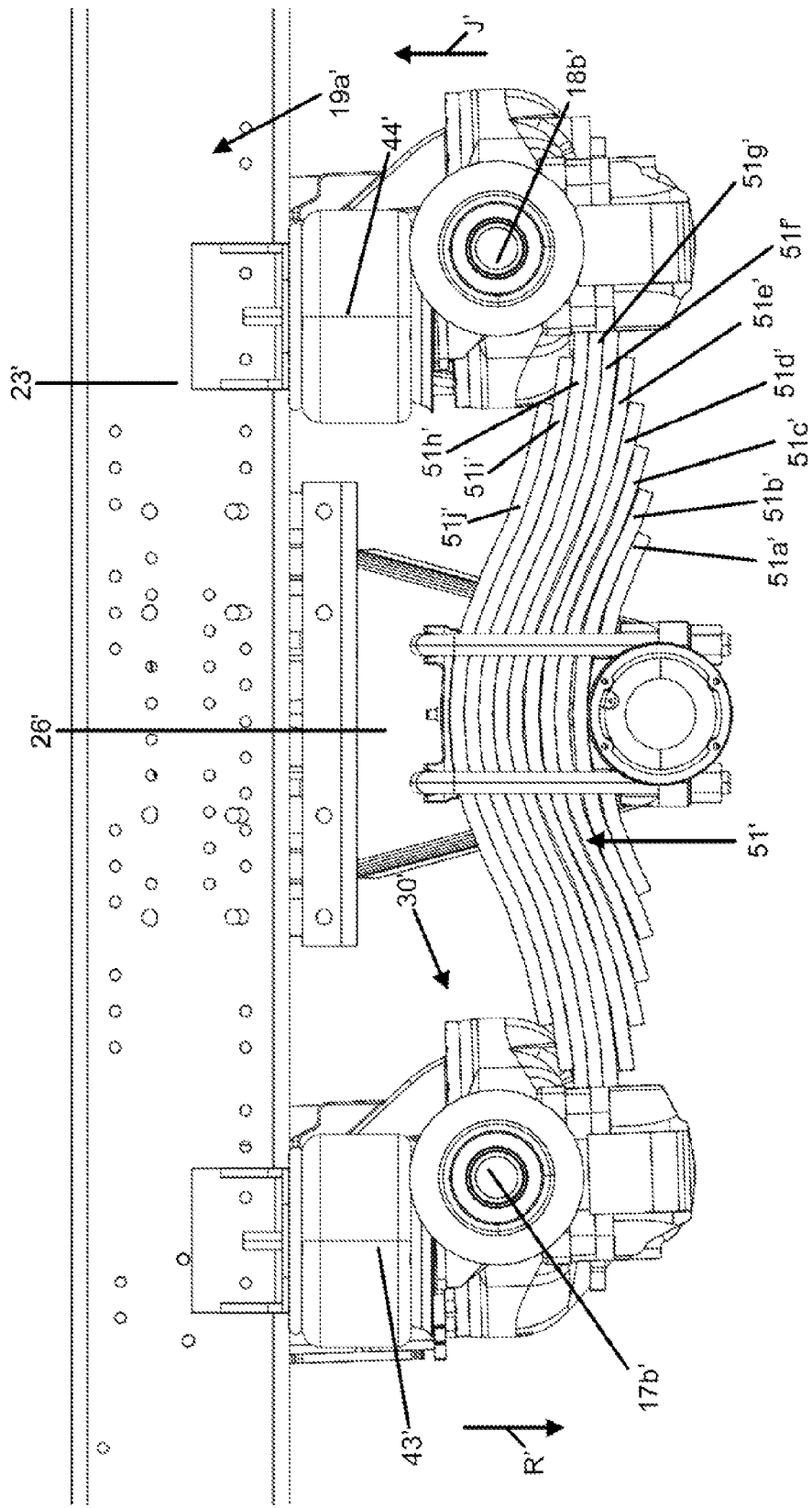
FIG. 7 depicts a side perspective view of a vehicle frame, opposite the side shown in FIG. 4, and a suspension system according to one embodiment of the invention.

FIGS. 6 and 7 depict mechanical springs 50', 51' according to another embodiment is depicted. The embodiment shown in FIGS. 6 and 7 is similar to the embodiment shown in FIGS. 1-5 and includes similar reference numbers, which denote similar components as described with respect to the embodiments shown in FIGS. 1-5.

According to one aspect of the present embodiment, the leveling springs 41'-44' are configured to support the sprung mass 19$a$' at one or more sprung mass load points, whereby the first and second mechanical springs 50', 51' may become substantially unloaded by the sprung mass 19$a$' of the vehicle 10' at one or more sprung mass load points.

According to one aspect of the present embodiment, the mechanical springs 50', 51' are provided with a first spring rate that is substantially equal to the second spring rate. Advantageously, providing mechanical springs 50', 51' with a first spring rate in the rebound direction R' that is substantially equal to the spring rate in the jounce direction J' provides the suspension system 30' with an increased roll rate, without degrading the ride quality.

FIGS. 6 and 7 depict one example of mechanical springs 50', 51' provided with a first spring rate in the rebound direction R' that is substantially equal to the second spring rate in the jounce direction J'. As shown, the mechanical springs 50', 51' may be leaf springs provided with a series of stacked individual spring members 50$a$'-50$j$', 51$a$'-51$j$' oriented whereby the lengths of at least some of the individual spring members, such as, for example, 50$a$'-50$f$', 51$a$'-51$f$', increase sequentially in the jounce direction J' and whereby the length of at least some of the individual spring members, such as, for example, 50$h$'-50$j$', 51$h$'-51$j$', decrease sequentially in the jounce direction J'.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. By way of example, and not limitation, although the leveling springs 41-44 and 41'-44 are depicted as air bladders, in alternative embodiments leveling springs in the form of air, hydraulic, or electric may be provided. By way of another example, and not limitation, although the mechanical springs 50, 51 and 50', 51 are shown as leaf springs, in alternative embodiments mechanical springs in the form of torsion or coil may be provided. By way of yet another example, although the mechanical springs 50, 51 and 50', 51' are shown as leaf springs provided with individual spring members 50$a$-50$j$, 51$a$-51$j$ or 50$a$'-50$j$', 51$a$'-51$j$' arranged in a manner to provide a first spring rate in the rebound direction R that is greater than a second spring rate in the jounce direction J or a first spring rate in the rebound direction R' that is substantially equal to the spring rate in the jounce direction J', those of ordinary skill in the art that any number of leaf spring arrangements may be utilized within the scope of the present embodiments and that the illustrated embodiments are one example of many. By way of still yet another example, although the present embodiments are described in the context of a truck tractor with a tandem axle, the principals of the present embodiments may be used in conjunction with other vehicles. By way of yet a further example, although the present embodiments are described in the context of a walking beam suspension, the principals of the present embodiments may be used in conjunction with other suspension types.

Furthermore, although specific embodiments of and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A vehicle, comprising:
    a sprung mass, including a vehicle frame;
    at least one axle provided with first and second ends;
    a suspension system provided with mechanical springs and leveling springs,
    wherein:
        the mechanical springs connect the axle ends to the frame and are provided with a spring rate in a rebound direction that is greater than or substantially equal to a spring rate in a jounce direction; and
        the leveling springs are configured to support the sprung mass at one or more sprung mass load points, whereby the mechanical springs may become substantially unloaded by the sprung mass of the vehicle at the one or more sprung mass load points.

2. The vehicle according to claim 1, wherein the mechanical springs are leaf springs.

3. The vehicle according to claim 1, wherein the leveling springs are air bladders.

4. The vehicle according to claim 1, wherein the mechanical springs are leaf springs provided with a series of stacked individual spring members oriented whereby the lengths of at least some of the individual spring members increase sequentially in the jounce direction.

5. The vehicle according to claim 1, wherein the mechanical springs are leaf springs provided with a series of stacked individual spring members oriented whereby the length of at least some of the individual spring members decrease sequentially in the jounce direction.

6. The vehicle according to claim 1, wherein the mechanical springs are leaf springs provided with a series of stacked individual spring members oriented whereby the lengths of at least some of the individual spring members increase sequentially in the jounce direction and whereby the length of at least some of the individual spring members decrease sequentially in the jounce direction.

7. The vehicle according to claim 1, wherein the at least one axle is a tandem axle provided with first and second axles and wherein the mechanical springs connect the axle ends of the first and second axles to the frame.

8. A method for increasing the roll rate of a vehicle provided with a sprung mass, including a vehicle frame, at least one axle provided with first and second ends, and a suspension system provided with mechanical springs and leveling springs, wherein the mechanical springs connect the axle ends to the frame, the method comprising the steps of:

using the leveling springs to support the sprung mass at one or more sprung mass load points, whereby the mechanical springs may become substantially unloaded by the sprung mass of the vehicle at the one or more sprung mass load points; and providing the mechanical springs with a spring rate in a rebound direction that is greater than or substantially equal to a spring rate in a jounce direction.

9. The method according to claim 8, wherein the mechanical springs are leaf springs.

10. The method according to claim 8, wherein the leveling springs are air bladders.

11. The method according to claim 8, wherein the mechanical springs are leaf springs provided with a series of staked individual spring members and the method further comprises the step of orienting the individual spring members whereby the lengths of at least some of the individual spring members increase sequentially in the jounce direction.

12. The method according to claim 8, wherein the mechanical springs are leaf springs provided with a series of staked individual spring members and the method further comprises the step of orienting the individual spring members whereby the length of at least some of the individual spring members decrease sequentially in the jounce direction.

13. The method according to claim 8, wherein the mechanical springs are leaf springs provided with a series of staked individual spring members and the method further comprises the steps of orienting the individual spring members whereby the lengths of at least some of the individual spring members increase sequentially in the jounce direction and orienting the length of at least some of the individual spring members decrease sequentially in the jounce direction.

14. The method according to claim 8, wherein the at least one axle is a tandem axle provided with first and second axles and wherein the mechanical springs connect the axle ends of the first and second axles to the frame.

* * * * *